United States Patent
Xu

(10) Patent No.: US 12,118,291 B2
(45) Date of Patent: Oct. 15, 2024

(54) METHOD AND APPARATUS, ELECTRONIC DEVICE AND STORAGE MEDIA FOR CONTENT PRESENTATION

(71) Applicant: Beijing Zitiao Network Technology Co., Ltd., Beijing (CN)

(72) Inventor: Kailin Xu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/542,309

(22) Filed: Dec. 15, 2023

(65) Prior Publication Data

US 2024/0119216 A1  Apr. 11, 2024

Related U.S. Application Data

(63) Continuation of application No. PCT/CN2023/071659, filed on Jan. 10, 2023.

(30) Foreign Application Priority Data

Jan. 27, 2022 (CN) .......................... 202210103776.0

(51) Int. Cl.
G06F 17/00 (2019.01)
G06F 40/106 (2020.01)
G06F 40/18 (2020.01)

(52) U.S. Cl.
CPC ............ G06F 40/106 (2020.01); G06F 40/18 (2020.01)

(58) Field of Classification Search
CPC .............................. G06F 40/106; G06F 40/18
See application file for complete search history.

(56) References Cited

U.S. PATENT DOCUMENTS 5,553,215 A * 9/1996 Kaethler ............... G06F 40/106
                                                    715/219
5,603,021 A * 2/1997 Spencer .................. G06F 40/18
(Continued)

FOREIGN PATENT DOCUMENTS

CN          1841361 A      10/2006
CN          1862528 A      11/2006
(Continued)

OTHER PUBLICATIONS

International Search Report in PCT/CN2023/071659, mailed Jul. 20, 2023, 5 pages.
(Continued)

*Primary Examiner* — Mohammed H Zuberi
(74) *Attorney, Agent, or Firm* — Astute IP Law Group

(57) ABSTRACT

Embodiments of the disclosure provide a method, an apparatus and an electronic device for content presentation. When a selection operation for a cell in a target table is detected, the content of the rich text in the selected cell can be obtained, and the style of the unit rich text can be obtained. Then, the target rich text can be generated based on the obtained content and style of the obtained rich text, where the style of the target rich text may be the same as that of the rich text, and the target rich text may be presented in a formula editing region of the target table. In this way, the content styles of the selected cells of content styles in the formula editing region in the target table can be kept consistent, so that the whole target table can be more regular.

20 Claims, 6 Drawing Sheets

(56) References Cited

U.S. PATENT DOCUMENTS

| | | | | |
|---|---|---|---|---|
| 6,185,582 | B1* | 2/2001 | Zellweger | G06F 40/18 715/212 |
| 6,592,626 | B1* | 7/2003 | Bauchot | G06F 40/18 715/217 |
| 7,155,667 | B1* | 12/2006 | Kotler | G06F 40/177 715/209 |
| 7,941,749 | B2* | 5/2011 | Agrawal | G06F 40/166 715/204 |
| 9,465,787 | B2* | 10/2016 | Kjaer | G06F 40/18 |
| 10,025,481 | B2* | 7/2018 | Bhargav | G06F 3/0485 |
| 2003/0056181 | A1* | 3/2003 | Marathe | G06F 40/18 715/267 |
| 2006/0224947 | A1* | 10/2006 | Weber | G06F 40/18 715/209 |
| 2007/0016850 | A1* | 1/2007 | Chen | G06F 40/18 715/212 |
| 2015/0025909 | A1* | 1/2015 | Hayter, II | G16H 30/20 705/3 |
| 2015/0113378 | A1* | 4/2015 | Otero | G06F 40/18 715/219 |
| 2016/0253306 | A1* | 9/2016 | Fan | G06F 40/106 715/227 |
| 2016/0253307 | A1* | 9/2016 | Kraynak | G06F 40/18 715/212 |
| 2017/0109136 | A1* | 4/2017 | Colle | G06F 8/20 |
| 2018/0067640 | A1* | 3/2018 | Jiang | G06F 17/10 |
| 2018/0157467 | A1 | 6/2018 | Stachura | |
| 2019/0340219 | A1* | 11/2019 | Schoedl | G06F 3/0481 |
| 2020/0294307 | A1 | 9/2020 | Yuan et al. | |

FOREIGN PATENT DOCUMENTS

| | | |
|---|---|---|
| CN | 101650709 A | 2/2010 |
| CN | 107817977 A | 3/2018 |
| CN | 112434033 A | 3/2021 |
| CN | 114626332 A | 6/2022 |

OTHER PUBLICATIONS

Office Action for Chinese Patent Application No. 202210103776.0, mailed Jul. 25, 2024, 23 pages.

* cited by examiner

| fx | www.baidu.com | |
|---|---|---|
| | www.baidu.com | |
| | TODAY IS RAINY | |
| | @XIAO WANG | 📎123 |

| fx | TODAY IS RAINY | |
|---|---|---|
| | www.baidu.com | |
| | TODAY IS RAINY | |
| | @XIAO WANG | 📎123 |

| fx | @XIAO WANG | |
|---|---|---|
| | www.baidu.com | |
| | TODAY IS RAINY | |
| | @XIAO WANG | 📎123 |

| fx | 📎123 | |
|---|---|---|
| | www.baidu.com | |
| | TODAY IS RAINY | |
| | @XIAO WANG | 📎123 |

METHOD AND APPARATUS, ELECTRONIC DEVICE AND STORAGE MEDIA FOR CONTENT PRESENTATION

CROSS REFERENCE

This application is a continuation of International Patent Application No. PCT/CN2023/071659, filed on Jan. 10, 2023, which claims the benefit of Chinese Patent Application No. 202210103776.0, filed on Jan. 27, 2022, both of which are hereby incorporated by reference in their entireties.

FIELD

The present disclosure relates to the technical field of the Internet, and in particular, to a method, an apparatus and an electronic device for content presentation.

BACKGROUND

With the development of science and technology, people may use tables to organize a wide variety of information. That is, a user may input corresponding information in a table to achieve sorting of information.

When the user selects a certain table, the content in the table may also be presented at a formula editing region above the table, and the user may also modify the content in the table in the formula editing region.

SUMMARY

The disclosure is provided in part to present in brief table ideas that will be described in detail in the specific embodiments section that follows. The disclosure content portion is not intended to identify key features or necessary features of the technical solution for which protection is claimed, nor is it intended to be used to limit the scope of the technical solution for which protection is claimed.

Embodiments of the present disclosure provide a method for content presentation, an apparatus for content presentation, and an electronic device that can make it possible to keep the style of the text content in a cell the same as the style of the text content in a formula editing region, and thus also make the target table more regularized as a whole.

In a first aspect, embodiments of the present disclosure provide a method for content presentation comprising: in response to detecting a selection operation for a cell in a target table, obtaining a content of a rich text in the selected cell, and determining a style of the rich text; generating a target rich text to be presented in a formula editing region of the target table based on the content of the rich text and the style of the rich text, wherein the target rich text has the same style as the rich text; and presenting the target rich text in the formula editing region of the target table.

In a second aspect, embodiments of the present disclosure provide an apparatus for content presentation which comprises: a first determining unit configured to, in response to detecting a selection operation for a cell in the target table, obtain a content of a rich text in the selected cell, and determining a style of the rich text; a generating unit configured to generate a target rich text for presenting in a formula editing region of the target table based on the content of the rich text and the style of the rich text, wherein a style of the target rich text is the same as the style of the rich text; a presenting unit configured to present the target rich text in the formula editing region of the target table.

In a third aspect, embodiments of the present disclosure provide an electronic device comprising: one or more processors; and a storage unit for storing one or more programs which, when executed by the one or more processors, cause the one or more processors to implement a method for content presentation in the first aspect.

In a fourth aspect, embodiments of the present disclosure provide a computer-readable medium storing a computer program thereon, the program, when executed by a processor, implementing the method for content presentation in the first aspect.

BRIEF DESCRIPTION OF THE DRAWINGS

The foregoing and other features, advantages, and aspects of embodiments of the present disclosure will become more apparent in conjunction with the accompanying drawings and with reference to the following specific embodiments. Throughout the accompanying drawings, the same or similar attachment marks indicate the same or similar elements. It should be understood that the accompanying drawings are schematic and that the originals and elements are not necessarily drawn to scale.

FIGS. 3A-3E are schematic diagrams of parts of a target table according to some other embodiments of a method for content presentation of the present disclosure;

DETAILED DESCRIPTION

Embodiments of the present disclosure will be described in greater detail below with reference to the accompanying drawings. Although certain embodiments of the present disclosure are shown in the accompanying drawings, it should be understood, however, that the present disclosure may be realized in various forms and should not be construed as being limited to the embodiments set forth herein, but rather are provided for a more thorough and complete understanding of the present disclosure. It should be understood that the accompanying drawings and embodiments of the present disclosure are for exemplary purposes only and are not intended to limit the scope of protection of the present disclosure.

It should be understood that the various steps documented in the method embodiments of the present disclosure may be performed in a different order, and/or in parallel. Furthermore, the method embodiments may include additional steps and/or omit performing the illustrated steps. The scope of the present disclosure is not limited in this regard.

The term "including" and variations thereof, as used herein, is open-ended, i.e., "including but not limited to."

The term "based on" is "based at least in part on." The term "one embodiment" means "at least one embodiment"; the term "another embodiment" means "at least one additional embodiment"; the term "another embodiment" means "at least one other embodiment."; and the term "some embodiments" means "at least some embodiments". Related definitions of other terms will be given in the following description.

It is to be understood that the concepts of "first", "second" and the like mentioned in the present disclosure are only used to differentiate different devices, modules or units, and are not used to define the order or interdependence of the functions performed by these devices, modules or units.

It is to be understood that the modifications of "one" and "a plurality of" mentioned in the present disclosure are schematic rather than limiting, and the person skilled in the art should understand that, unless otherwise expressly stated in the context, they should be understood as "one or more".

The names of the messages or information interacting between the plurality of apparatuses of the present disclosure are for illustrative purposes only and are not intended to limit the scope of those messages or information.

Figure 1:
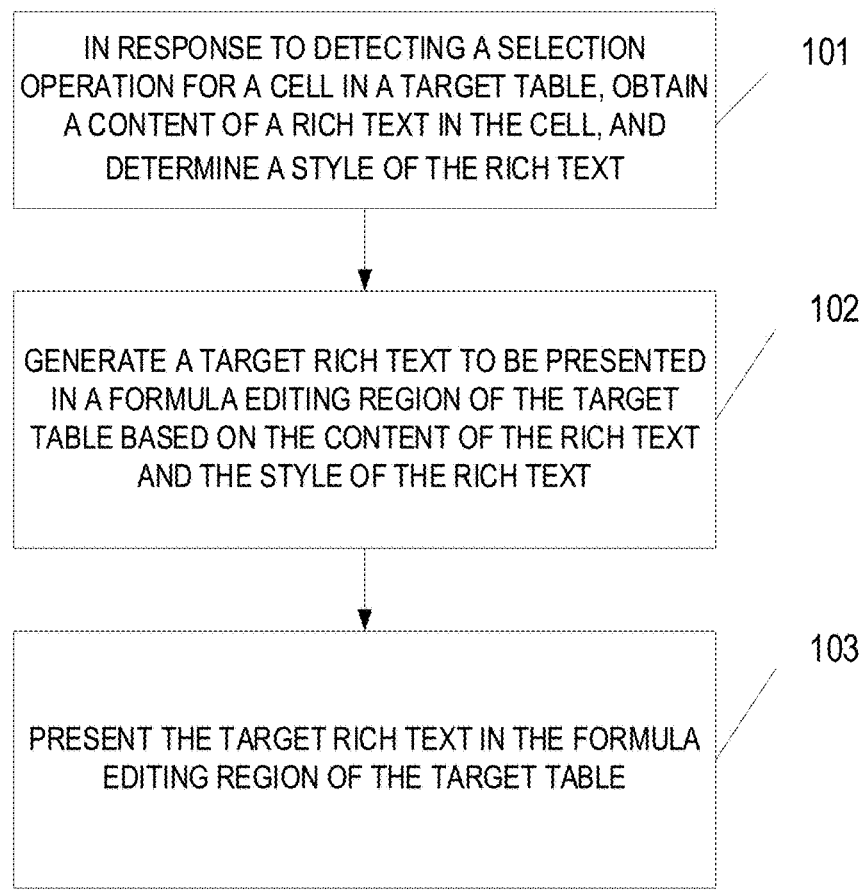
FIG. 1 is a flowchart according to an embodiment of a method for content presentation of the present disclosure.

Reference is made to FIG. 1, which illustrates a flow of an embodiment of a method for content presentation according to the present disclosure. The method for content presentation may be applied to a terminal device. The method for content presentation, as shown in FIG. 1, includes the following steps:

Step 101, in response to detecting a selection operation for a cell in a target table, obtaining a content of a rich text in the selected cell, and determining a style of the rich text.

As an example, an executing body of the method for content presentation may detect a user's selection operation against a cell of the target table. The selection operation may be, but is not limited to, a click operation, a long-press operation, a double-click operation, and the like on the cell. After the execution body of the method for content presentation detects the selection operation for a cell, it may determine the rich text in the selected cell, and may obtain the content of the rich text and determine the style of the rich text.

As an example, the target table may include at least one cell, the contents recorded in different cells of the target table may be different, and the style of the contents in the different cells may be different. For example, the cells may be filled with content, or links, hyperlinks, and the like. That is, the content in the target table may have a certain style, the content with a certain style may be called as rich text. In other words, it may be understood that the rich text in different cells may be different (content and/or style of the rich text may be different).

As an example, text with multiple styles may be understood as rich text. And rich text may include the text content and text style in a cell. Thus, the text content in different cells may be different, and the text styles may be different, and thus different rich texts may be different.

Step 102, generating a target rich text to be presented in a formula editing region of the target table based on the content of the rich text and the style of the rich text.

Here, the style of the target rich text is the same as the style of the rich text. Thus, the content presented in the formula editing region of the target table may also have a certain style.

As an example, the execution body of the content presentation method may generate the target rich text based on the content of the rich text and the style of the rich text. For example, the execution body of the method for content presentation may input the content of the rich text and the style of the rich text into the rich text editor, and after the output of the rich text editor is converted to the corresponding format, the target rich text may be generated for presenting in the formula editing region.

As an example, the formula editing region of the table may be used to synchronize the presenting of the content in the selected cell.

As an example, the style of the rich text and the target rich text style is the same may be understood as the rich text of the style of the target rich text are the same as the style of each; for example, font style, font size, whether to indicate the link, font color, etc. are the same.

Figure 2:
FIG. 2 is a schematic diagram of a portion of a target table according to some embodiments of a method for content presentation of the present disclosure.

It is to be understood here that, in related technology, the target table of the cell and the formula editing region each support the presenting of the format there are differences, for example, the format presented in the cell cannot be presented in the formula editing region. Therefore, in related technology, the table of the formula editing region only present the content of the rich text, and will not reflect the style of the text content presented in the formula editing region. For ease of understanding, the related technology may be understood in conjunction with FIG. 2. FIG. 2 illustrates a portion of the target table area, and it may be seen from FIG. 2 that the content of the rich text in the selected cell 201 may be presented in the formula editing region 202, but the style of the content of the rich text of the cell is not presented in the formula editing region. That is, a glyph style, a font size style, and so on in the selected cell 201 are not reflected in the formula editing region 202.

The present application generates target rich text for presenting in the formula editing region of the target table by means of the content of the rich text and the style of the rich text. The format of the target rich text may match the format supported by the formula editing region. As such, the text content presented in the formula editing region may also be given a certain style.

As an example, there are many ways to generate the target rich text for presenting in the formula editing region of the target table, and it is only necessary to make a reasonable selection according to the actual situation. For example, a rich text editor may be used to render the content of the rich text, and then convert the rendered text content into a text content that may be presented in the formula editing region. Thus, the target rich text can be obtained. For example, the target rich text may also be obtained by directly utilizing a predetermined format conversion model (used for converting the format in the cell to a format that may be presented in the formula editing region).

Step 103, presenting the target rich text in the formula editing region of the target table.

As an example, after generating the target rich text, the executing body of the method for content presentation may present the target rich text in the formula editing region of the target table.

As an example, since the style of the target rich text is the same as the style of the rich text, it is possible for both the content and style of the text in the selected cell can be reflected in the formula editing region, thereby the target table can be more regularized as a whole.

As can be seen, in the embodiment of the present application, when a selection operation for the cell in the target table is detected, the text content of the rich text of the cell in the selected cell may be obtained, and the style of the rich text of the cell may be obtained. Then the target rich text may be generated according to the text content and style of the rich text of the cell. At the same time, the style of the target rich text may be the same as that of the cell, and the target rich text may be reflected in the formula editing region of the target table as a whole. Thus, the content style of selected cells in the formula editing region of the target table may be kept consistent, thereby the target table may be more regularized as a whole.

Further, when the rich text includes hyperlinks, attachment links, links used to indicate a specific user (e.g., @XXX links), etc., the user may not only trigger these links in the selected cell to open the page corresponding to these links, but also trigger these links in the formula editing region to open the page corresponding to these links. That is, it may be more convenient to trigger various types of links in the target table.

In order to facilitate the understanding of the way for presenting of the present application, descriptions are provided in conjunction with FIGS. 3A-3D. FIGS. 3A-3D may be understood as partial schematic diagrams of the target table of the embodiments provided in the present application, respectively. From FIGS. 3A-3D, it may be seen that the styles of the rich text in the selected cells and the styles of the target rich text presented in the formula editing region 301 may be exactly the same.

In some embodiments, the style of the rich text includes at least one of the following: a font, a glyph, a hyperlink, an attachment link, or a link for indicating a particular user.

Figure 3E:
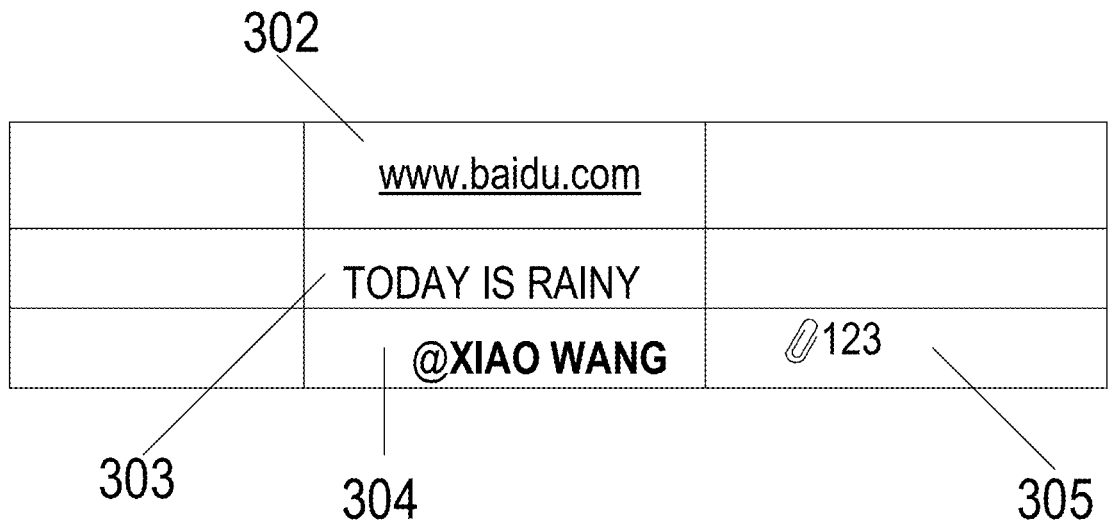

For ease of understanding, reference may be made to FIG. 3E. FIG. 3E is a schematic diagram of a portion of a target table of an embodiment provided by the present application. In FIG. 3E, the style of the rich text in cell 302 may include font, glyphs, and hyperlinks; the style of the rich text in cell 303 may include font and glyphs; the style of the rich text in cell 304 may include font, glyphs, and a link for indicating a particular user; and the style of the rich text in cell 304 may include font, glyph, and an attachment link.

In some embodiments, step 102 (generating, based on the text content of the rich text and the style of the rich text, the target rich text for presenting in the formula editing region of the target table) may specifically include: generating a style rendering instruction based on the style of the rich text; inputting the style rendering instruction and the text content into a rich text editor; and generating the target rich text based on a result of the rendering of the text content by the rich text editor.

Here, the rich text editor is used to perform style rendering for the text content according to the style rendering instruction.

As an example, since the presentation format to which the cell is adapted may not be adapted to the formula editing region, there is a need to generate the target rich text that may be presented in the formula editing region.

As an example, a rich text editor may be utilized to generate the target rich text. For example, a rich text editor may be preset. When a cell is selected, the text content and style of the rich text of the cell may be obtained, and the style of the rich text of the cell may be recognized and processed. Then, a rendering instruction used to indicate the rendering method of the rich text editor is generated. After that, the rendering instruction and the text content both may be entered into the rich text editor, so that style rendering may be performed on the text content by using the rich text editor, and the rendering result may be obtained.

It is to be understood that some rendering results may be directly presented in the formula editing region. At this time, the rendering results may be understood as the target rich text. However, the formats of some rendering results may need to be converted, so that the target rich text can be obtained. When format conversion of the rendering results is required, the way of format conversion may be determined according to the format adapted by the formula editing region. Of course, in concrete implementations, the specific conversion method used to obtain the target rich text corresponding to the rendering results may also be set according to the actual situation.

In some embodiments, the target table may include a presentation interface, the presentation interface may include at least one style control, and each style control may be used to indicate a rendering style. In response to detecting a selection operation for the formula editing region, a rendering style corresponding to the target rich text is determined. A way for presenting the style control corresponding to the respective determined rendering style is adjusted in the presentation interface.

As an example, adjusting the presentation forms of the style controls corresponding to the determined rendering styles may facilitate the user to know which styles the target rich text currently has, and thus may facilitate the user to re-edit the target rich text.

As an example, how to adjust the presentation table of the style control may be set according to the actual situation, and there is no restriction on how to adjust the presentation table here. For example, the style control may be enlarged, the color may be converted, an identification layer may be added, and so on.

In some embodiments, the rendering style corresponding to the target rich text may be determined as follows: obtaining rendering styles that are applied when performing the rendering for the text content by the rich text editor; determining at least one applied target rendering style based on the number of rendering characters corresponding to the respective rendering styles from the rendering styles that are applied; and determining the rendering style corresponding to the target rich text based on the at least one applied target rendering style.

As an example, when editing text content using a rich text editor, various rendering styles may be used. For example, different words in the generated target rich text may have different font types or different font colors, and a combination of certain characters may construct a link (e.g., a combination of characters "www.baidu.com" may construct a link), and so on. In this case, several rendering styles may need to be used, and the number of rendering characters corresponding to each rendering style may be recorded. The number of rendering characters corresponding to different rendering styles may be different. Some rendering styles corresponding to a large number of rendering characters, while some rendering styles corresponding to a small number of rendering characters less. Thus, the rendering styles corresponding to the large number of rendering characters may be filtered out. Alternatively, the rendering styles applied to most characters may be filtered out and these rendering styles are identified as the target rendering style to be applied. Then, the target rendering style may be used to determine the rendering styles corresponding to the target rich text.

As an example, based on the number of rendered characters corresponding to each rendering style, the applied target rendering style is determined, and then the rendering style corresponding to the target rich text is determined based on the applied target rendering style. This enables the rendering style corresponding to the rich text to be the style of most text content in the target rich text, and thus the style of the target rich text may be more accurately reflected.

Figure 4A:
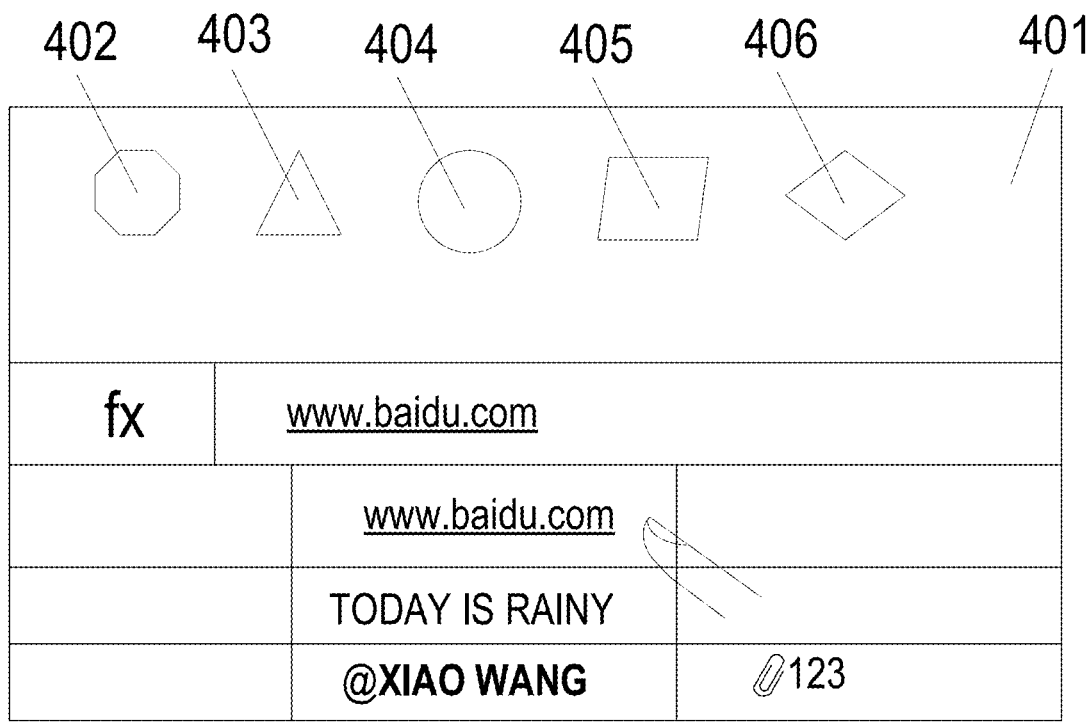
FIGS. 4A-4B are schematic diagrams of parts of a target table according to some other embodiments of a method for content presentation of the present disclosure.
Figure 4B:
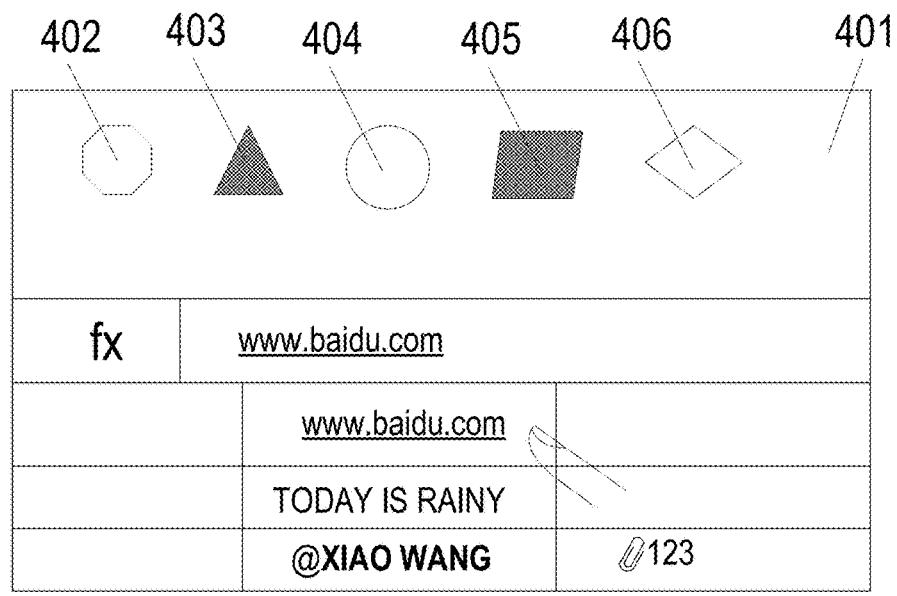

For ease of understanding, illustration may be made in conjunction with FIGS. 4A and 4B, which are schematic diagrams of portions of a target table in embodiments of the present disclosure. As can be seen from FIG. 4A, the target table may include a presentation interface 401, and at least one style control may be presented in the presentation interface (which may include a style control 402, a style control 403, a style control 404, a style control 405, style control 406). Upon detecting a selection operation for the formula editing region, the presentation of some of the style controls may be adjusted. As shown in FIG. 4B, the style control 403 and the style control 405 in the presentation interface 401 are adjusted. This facilitates the user to be aware of which styles the target rich text has.

In some embodiments, in response to receiving a first style change instruction, the style of the rich text and the style of the target rich text are changed according to the first style change instruction.

Here, the first style change instruction is used to change the style of the rich text.

As an example, when the style of the rich text is changed, the style of the target rich text is also changed accordingly. As such, when the user changes the style of the rich text, the style of the text content in the selection cell may also be consistent with the style of the text in the formula editing region, thus making the target table more regularized as a whole.

As an example, the rich text editor may also be used to change the style of the target rich text. For example, a rendering change instruction may be generated based on the style change of the rich text of the cell, and the last rendering result may be changed based on the rendering change instruction. Then, the style of the target rich text may be changed based on the rendering results after the change. Of course, in specific implementations, the way for changing the style of the target rich text may also be selected according to actual situations, and the way for changing the style of the target rich text is not determined here.

In some embodiments, the target table may include a presentation interface, and the presentation interface may include at least one style control, and each style control is used to indicate a rendering style. In this case, the first style change instruction may be generated by generating the first style change instruction based on a triggering operation for the presented style control.

As an example, the presenting of the style controls enables a user to trigger the style controls and implement customized style changes to the text content in the selected cells, which not only facilitates the user to change the style, but also facilitates the user to customize the style.

In some embodiments, in response to receiving a second style change instruction, the style of the target rich text and the style of the rich text are changed according to the second style change instruction.

Here, the second style change instruction is used to change the style of the target rich text.

As an example, it is also possible to directly input the second style change instruction and directly change the style of the target rich text. After the style of the target rich text is changed, the style of the corresponding rich text is also changed. In this way, the target table may also be made more regularized.

In some embodiments, the second style change instruction may be generated in the following manner: in response to detecting a selection operation for the formula editing region, presenting an editing operation interface corresponding to the rich text editor; and generating the second style change instruction based on a selection operation for an editing icon in the editing operation interface.

Here, the editing operation interface includes at least one edit icon.

As an example, since the style rendering of the target rich text may be accomplished using the rich text editor, the editing operation interface corresponding to the rich text editor may be presented after detecting the selection operation for the formula editing region, and the second style change instruction may be generated based on the user's selection operation on the editing icon in the editing operation interface of the rich text.

As can be seen, when a cell is selected, the user may input a first style change instruction to make changes to the style of the rich text and the style of the target rich text, respectively. When the formula editing region is selected, the user may input the second style change instruction to make changes to the style of the rich text and the style of the target rich text, respectively. In this way, it is possible for the user to change the style of the rich text and the style of the target rich text in a more convenient manner.

In some embodiments, the target table may be an online table. If the target table is an online table, the cell is usually smaller. In this case, the rich text in the selected cell and the target rich text style is the same, which facilitates the user to better browse the cell (for example, the cell only presents partial content, while the formula editing region may present all the content in the selected cell, and the style of the presented content is also the same as the style of the text content in the cell).

In some embodiments, after the style control in the presentation interface is presented, if the formula editing region is selected, the presentation interface may not present an operation page of the rich text editor. Only when the user performs a trigger operation on the style control, the rendering style is determined based on the style control triggered by the user. Then, the rendering instruction that may be recognized by the rich text editor may be generated according to the rendering style, and then the rich text editor may be utilized to render the text content according to the rendering instruction, and the style of the target rich text may be changed. Correspondingly, when the style of the target rich text is changed, the style of the rich text in the cell may also be changed accordingly.

Figure 5:
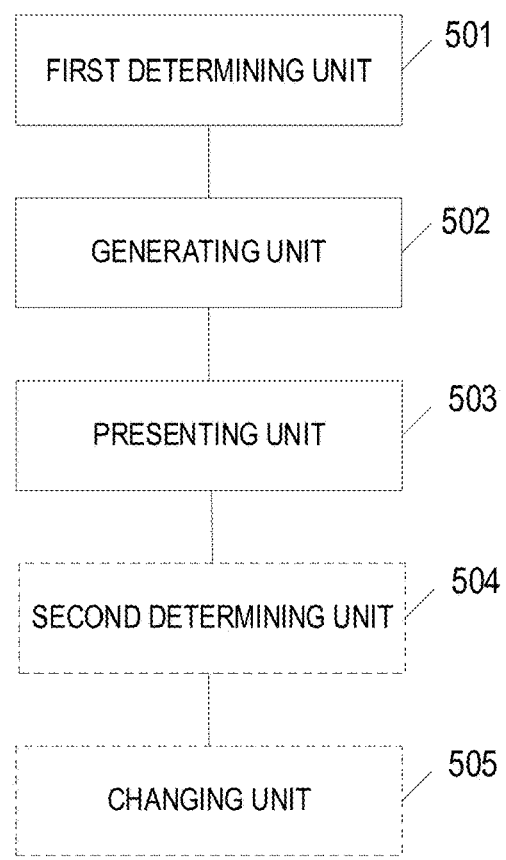
FIG. 5 is a schematic diagram of a structure of an embodiment of an apparatus for content presentation according to the present disclosure.

Referring further to FIG. 5, as an implementation of the method shown in each of the above figures, the present disclosure provides an embodiment of an apparats for content presentation. The embodiment of the apparatus corresponds to the embodiment of the method for content presentation shown in FIG. 1, which may be applied in various electronic devices.

As shown in FIG. 5, the apparats for content presentation in the embodiment includes: a first determining unit 501 configured to, in response to detecting a selection operation for a cell in a target table, obtain a text content of a rich text in the selected cell, and determine a style of the rich text; a generating unit 502 configured to generate a target rich text to be presented in a formula editing region of the target table based on the text content of the rich text and the style of the rich text, wherein the target rich text has the same style as the rich text; a presenting unit 503 configured to present the target rich text in the formula editing region of the target table.

In some embodiments, the above generation unit 502 is further configured to generate a style rendering instruction based on the style of the rich text; input the style rendering instruction and the text content into a rich text editor, wherein the rich text editor is used to perform style rendering for the text content according to the style rendering instruction; and generate the target rich text based on a result of the rendering of the text content by the rich text editor.

In some embodiments, the above target table comprises a presentation interface, the above presentation interface comprising at least one style control, and each style control is used to indicate a rendering style. The aforesaid device further comprises a second determining unit 504 configured to, in response to detecting a selection operation for the formula editing region, determine a rendering style corresponding to the target rich text; and adjust a way for presenting the style control corresponding to the respective determined rendering style in the presentation interface.

In some embodiments, the second determination unit 504 is further configured to obtain rendering styles that are applied when performing the rendering for the text content by the rich text editor; determine at least one applied target rendering style based on the number of rendering characters corresponding to the respective rendering styles from the rendering styles that are applied; and determine the rendering style corresponding to the target rich text based on the at least one applied target rendering style.

In some embodiments, the above apparatus further comprises a changing unit 505 configured to in response to receiving a first style change instruction, changing the style of the rich text and the style of the target rich text according to the first style change instruction, whereby the first style change instruction is used to change the style of the rich text.

In some embodiments, the target table comprises a presentation interface, the presentation interface comprises at least one style control, and each style control is used to indicate a rendering style. The changing unit 505 is further configured to generate the first style change instruction based on a triggering operation for the presented style control.

In some embodiments, the changing unit 505 is further configured to, in response to receiving a second style change instruction, change the style of the target rich text and the style of the rich text according to the second style change instruction, whereby the second style change instruction is used to change the style of the target rich text.

In some embodiments, the above changing unit 505 is further configured to, in response to detecting a selection operation for the formula editing region, present an editing operation interface corresponding to the rich text editor, wherein the editing operation interface comprises at least one editing icon; and generate the second style change instruction based on a selection operation for an editing icon in the editing operation interface.

In some embodiments, the style of the rich text includes at least one of the following: a font, a glyph, a hyperlink, an attachment link, a link for indicating a specific user.

Figure 6:
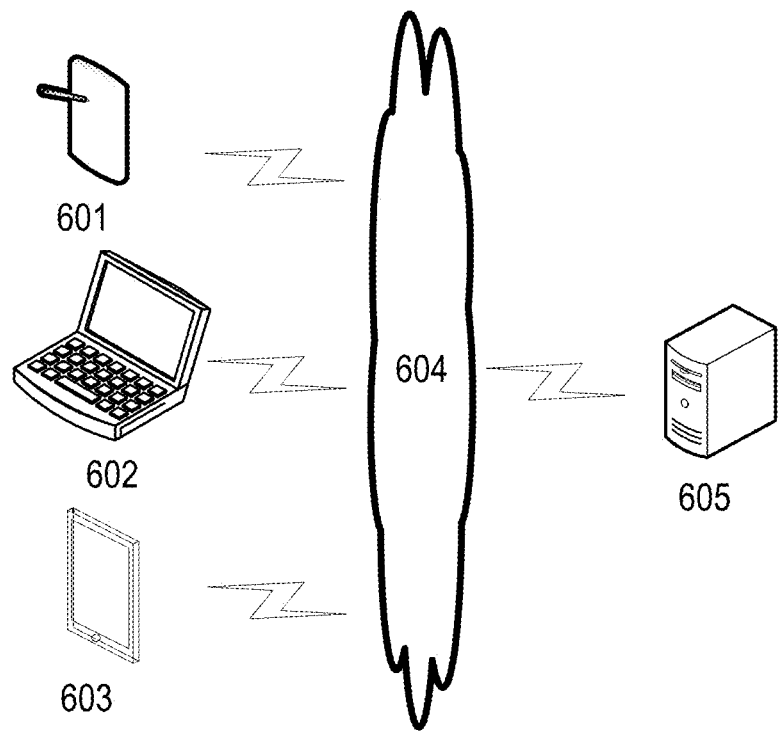
FIG. 6 is an exemplary system architecture to which an embodiment of a method for content presentation of the present disclosure may be applied.

Referring to FIG. 6, which illustrates an exemplary system architecture to which a method for content presentation of an embodiments of the present disclosure may be applied.

As shown in FIG. 6, the system architecture may include end devices 601, 602, and 603, a network 604, and a server 605. The network 604 may be used to provide a medium of a communication link between the end devices 601, 602, and 603 and the server 605. The network 604 may include various connection types, such as wired, wireless communication links or fiber optic cables, among others.

The end devices 601, 602, and 603 may interact with the server 605 via the network 604 to receive or transmit messages, etc. The terminal devices 601, 602, and 603 may have various client applications installed on them, such as a web browser application, a search application, a news and information application. The client applications in the terminal devices 601, 602, and 603 may receive commands from the user and complete corresponding functions according to the user's commands, such as adding corresponding information to the message according to the user's commands.

The terminal devices 601, 602, and 603 may be hardware or software. When the terminal device 601, 602, and 603 is hardware, it may be a variety of electronic devices having a display screen and supporting web browsing, including but not limited to a smartphone, a tablet computer, an e-book reader, an MP3 player (Moving Picture Experts Group Audio Layer III, Moving Picture Experts Compression Standard Audio Layer 3), MP4 (Moving Picture Experts Group Audio Layer IV, Moving Picture Experts Compression Standard Audio Layer 4) players, laptop and desktop computers, and the like. When the terminal devices 601, 602, and 603 are software, they may be installed in the electronic devices listed above. It may be realized as a plurality of software or software modules (e.g., software or software modules used to provide distributed services) or as a single software or software module. No specific limitations are made herein.

The server 605 may be a server that provides various services, such as receiving the information obtaining request sent by the terminal devices 601, 602, and 603, obtaining the presenting information corresponding to the information obtaining request by various means according to the information obtaining request, and sending the data related to the presenting information to the terminal devices 601, 602, and 603.

It is to be noted that the method of information processing provided by the embodiments of the present disclosure may be implemented by a terminal device. Accordingly, the apparatus for content presentation may be disposed in the terminal devices 601, 602, and 603. In addition, the method of information processing provided in the embodiments of the present disclosure may also be implemented by the server 605. Accordingly, the apparatus for information processing may be disposed in the server 605.

It should be understood that the number of terminal devices, networks, and servers in FIG. 6 is merely illustrative. There may be any number of terminal devices, networks, and servers as needed for implementation.

Figure 7:
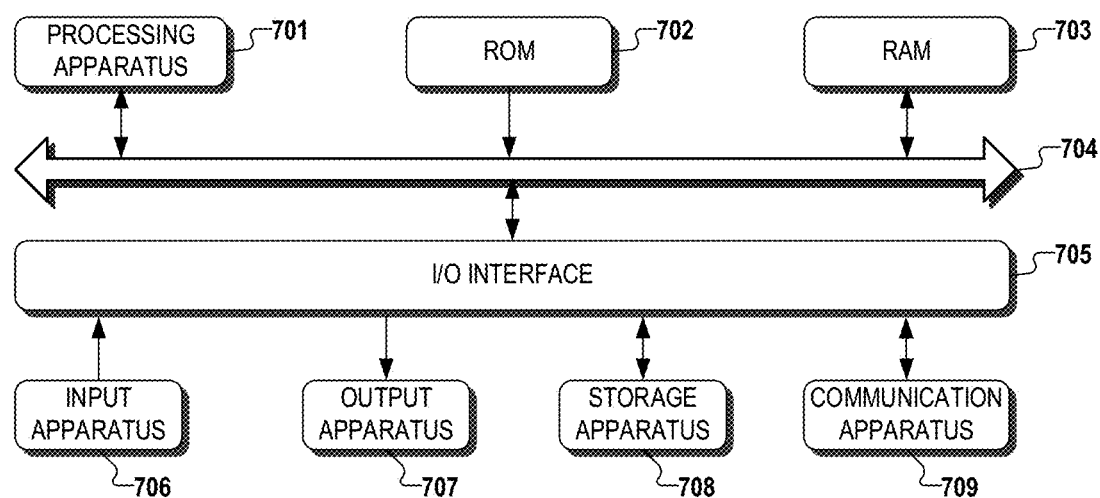
FIG. 7 is a schematic diagram of a basic structure of an electronic device provided according to an embodiment of the present disclosure.

Reference is made below to FIG. 7, which illustrates a schematic view of a structure of an electronic device (e.g., a terminal device or a server in FIG. 6) suitable for use in realizing an embodiment of the present disclosure. Terminal devices in embodiments of the present disclosure may include, but are not limited to, mobile terminals such as cell phones, laptop computers, digital broadcast receivers, PDAs (personal digital assistants), PADs (tablet computers), PMPs (portable multimedia players), in-vehicle terminals (e.g., in-vehicle navigation terminals), and the like, as well as fixed terminals such as digital TVs, desktop computers, and the like. The electronic device illustrated in FIG. 7 is merely an example and should not suggest any limitation on the functions and scope of use of the embodiments of the present disclosure.

As illustrated in FIG. 7, the electronic device may include a processing apparatus (e.g., a central processor, a graphics processor, and the like) 701 which may perform various appropriate actions and processes based on a program stored in a read-only memory (ROM) 702 or loaded from a storage device 508 into a random access memory (RAM) 703. Also stored in the RAM 703 are various programs and data necessary for the operation of the electronic device 700. The processing apparatus 701, the ROM 702, and the RAM 703 are connected to each other via a bus 704. The input/output (I/O) interface 705 is also connected to the bus 704.

Typically, the following devices may be connected to the I/O interface 705: an input apparatus 706 including, for example, a touch screen, a touch pad, a keyboard, a mouse, a camera, a microphone, an accelerometer, a gyroscope, and the like; an output apparatus 707 including, for example, a liquid crystal display (LCD), a loudspeaker, a vibrator, and the like; a storage apparatus 708 including, for example, a magnetic tape, a hard disk, and the like; and a communication apparatus 709. The communication apparatus 709 may allow electronic devices to wirelessly or wiredly communicate with other devices to exchange data. Although FIG. 7 illustrates an electronic device with various devices, it should be understood that it is not required to implement or have all of the illustrated devices. More or fewer apparatuses may alternatively be implemented or possessed.

In particular, according to embodiments of the present disclosure, the processes described above with reference to the flowcharts may be implemented as computer software programs. For example, embodiments of the present disclosure include a computer program product comprising a computer program carried on a non-transitory computer-readable medium, the computer program comprising program code for performing the method shown in the flowchart. In such embodiments, the computer program may be downloaded and installed from a network via a communication apparatus 709, or installed from a storage apparatus 708, or installed from a ROM 702. When this computer program is executed by the processing apparatus 701, the above-described functions defined in the method of the embodiments of the present disclosure are performed.

It is noted that the computer-readable medium described above in the present disclosure may be a computer-readable signal medium or a computer-readable storage medium or any combination thereof. The computer-readable storage medium may, for example, be—but is not limited to—a system, device, or apparatus or device of electricity, magnetism, light, electromagnetism, infrared, or semiconductors, or any combination of the above. More specific examples of computer-readable storage media may include, but are not limited to: electrical connections having one or more wires, portable computer disks, hard disks, random access memory (RAM), read-only memory (ROM), erasable programmable read-only memory (EPROM or flash memory), optical fibers, portable compact disk read-only memories (CD-ROM), optical storage devices, magnetic memory device, or any suitable combination of the foregoing. In the context of the present disclosure, a computer-readable storage medium may be any tangible medium containing or storing a program that may be used by or in combination with an instruction execution system, apparatus, or device. In the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signalling medium may also be any computer-readable medium other than a computer-readable storage medium, which computer-readable signalling medium may send, propagate, or transmit a program for use by, or in conjunction with, an instruction-executing system, apparatus, or device. The program code contained on the computer-readable medium may be transmitted using any suitable medium, including, but not limited to: wire, fibre optic cable, RF (radio frequency), etc., or any suitable combination of the foregoing.

In some embodiments, the client and the server may communicate by using any currently known or future developed network protocol such as HTTP (HyperText Transfer Protocol), and may be interconnected with digital data communication in any table or medium (for example, communication network). Examples of communication networks include a local area network ("LAN"), a wide area network ("WAN"), the Internet work (for example, the Internet) and end-to-end networks (for example, ad hoc end-to-end networks), as well as any currently known or future developed networks.

The computer-readable medium may be included in the electronic device, or it may exist alone without being assembled into the electronic equipment.

The computer-readable medium carries one or more programs, which, when executed by the electronic device, cause the electronic device to: in response to detecting a selection operation for a cell in a target table, obtain a content of a rich text in the selected cell, and determine a style of the rich text; generate a target rich text to be presented in a formula editing region of the target table based on the content of the rich text and the style of the rich text, wherein the target rich text has the same style as the rich text; and present the target rich text in the formula editing region of the target table.

In some embodiments, the generating a target rich text to be presented in a formula editing region of the target table based on the content of the rich text and the style of the rich text includes: generating a style rendering instruction based on the style of the rich text; inputting the style rendering instruction and the content into a rich text editor, wherein the rich text editor is used to perform style rendering for the content according to the style rendering instruction; and generating the target rich text based on a result of the rendering of the content by the rich text editor.

In some implementations, the target table comprises a presentation interface, the presentation interface comprises at least one style control, and each style control is used to indicate a rendering style. When executed by the electronic device, the one or more of the programs cause the electronic device to: in response to detecting a selection operation for the formula editing region, determine a rendering style corresponding to the target rich text; and adjust a way for presenting the style control corresponding to the respective determined rendering style in the presentation interface.

In some embodiments, the determining a rendering style corresponding to the target rich text comprises: obtaining rendering styles that are applied when performing the rendering for the content by the rich text editor; determining at least one applied target rendering style based on the number of rendering characters corresponding to the respective rendering styles from the rendering styles that are applied; and determining the rendering style corresponding to the target rich text based on the at least one applied target rendering style.

In some implementations, when executed by the electronic device, the one or more of the programs cause the electronic device to: in response to receiving a first style change instruction, change the style of the rich text and the style of the target rich text according to the first style change instruction, wherein the first style change instruction is used to change the style of the rich text.

In some implementations, the target table comprises a presentation interface, the presentation interface comprises at least one style control, each style control is used to indicate a rendering style, and the first style change instruction is generated by generating the first style change instruction based on a triggering operation for the presented style control.

In some implementations, when executed by the electronic device, the one or more of the programs cause the electronic device to: in response to receiving a second style change instruction, change the style of the target rich text and the style of the rich text according to the second style change instruction, wherein the second style change instruction is used to change the style of the target rich text.

In some implementations, the second style change instruction is generated by: in response to detecting a selection operation for the formula editing region, presenting an editing operation interface corresponding to the rich text editor, wherein the editing operation interface comprises at least one editing icon; and generating the second style change instruction based on a selection operation for an editing icon in the editing operation interface.

In some implementations, the style of the rich text includes at least one of the following: a font, a glyph, a hyperlink, an attachment link, or a link for indicating a particular user.

Computer program code for performing the operations of the present disclosure may be written in one or more programming languages, or combinations thereof, including, but not limited to, object-oriented programming languages—such as Java, Smalltalk, C++—and conventional procedural programming languages—such as the "C" language. "C" or similar programming languages. The program code may be executed entirely on the user's computer, partially on the user's computer, as a stand-alone software package, partially on the user's computer and partially on a remote computer, or entirely on a remote computer or server. In the case involving a remote computer, the remote computer may be connected to the user computer via any kind of network—including a local area network (LAN) or a wide area network (WAN)—or, alternatively, it may be connected to an external computer (e.g., by utilizing an Internet service provider to connect via the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It is also noted that each of the boxes in the block diagram and/or flowchart, and combinations of the boxes in the block diagram and/or flowchart, may be implemented with a specialized hardware-based system that performs the specified function or operation, or may be implemented with a combination of specialized hardware and computer instructions.

The units described as being involved in embodiments of the present disclosure may be implemented by way of software or may be implemented by way of hardware. For example, the first determination unit may also be described as "a unit for determining the style of the rich text".

The functions described above herein may be performed, at least in part, by one or more hardware logic components. For example, non-limitingly, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing, any suitable combination thereof.

The foregoing descriptions are merely illustrative of the preferred embodiments of the present disclosure and of the technical principles utilized. It should be understood by those skilled in the art that the scope of the disclosure covered in the present disclosure is not limited to a technical solution formed by a particular combination of the above-described technical features, but also covers other technical solutions formed by any combination of the above-described technical features or their equivalent without departing from the above-described disclosure concept. For example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter defined in the appended claims is not necessarily limited to the particular features or actions described above. Rather, the particular features and actions described above are merely exemplary forms of implementing the claims.

Embodiments of the present disclosure provide method for content presentations, apparatuses, and electronic devices that, upon detecting a selection operation against a cell in a target table, may acquire a content of a rich text in the selected cell, and may acquire a style of the rich text, and then may generate a target rich text based on the acquired content and style of the rich text, and the style of the target rich text may be the same as the style of the rich text, and the target rich text may be the same as the style of the rich text, and the target rich text may be the same as the rich text. The style of the target rich text may be the same as the style of the rich text, and the target rich text may be presented in the formula editing region of the target table; in this way, the content style of the selected cells in the formula editing region of the target table may be kept consistent, so as to make the target table more regularized as a whole.

Further, when the rich text includes hyperlinks, attachment links, links used to indicate a specific user (e.g., @XXX links), etc., the user can not only trigger these links in the selected cell to open the page corresponding to these links, but also trigger these links in the formula editing region to open the page corresponding to these links; that is to say, it can be more convenient to trigger various types of links in the target table. In other words, it is easier to trigger the links in the target table.

The invention claimed is:

1. A method for content presentation, comprising:
   in response to detecting a selection operation for a cell in a target table, obtaining a content of a rich text in the cell, and determining a style of the rich text;
   generating a target rich text to be presented in a formula editing region of the target table based on the content of the rich text and the style of the rich text, wherein the target rich text has the same style as the rich text;
   presenting the target rich text in the formula editing region of the target table; and
   in response to receiving a style change instruction, changing the style of the rich text and the style of the target rich text according to the style change instruction, wherein the style change instruction is used to change the style of the rich text or the style of the target rich text.

2. The method of claim 1, wherein the generating a target rich text to be presented in a formula editing region of the target table based on the content of the rich text and the style of the rich text comprises:
   generating a style rendering instruction based on the style of the rich text;
   inputting the style rendering instruction and the content into a rich text editor, wherein the rich text editor is used to perform style rendering for the content according to the style rendering instruction; and
   generating the target rich text based on a result of the rendering of the content by the rich text editor.

3. The method of claim 1, wherein the target table comprises a presentation interface, the presentation interface comprises at least one style control, and each style control is used to indicate a rendering style; and
   the method further comprises:
   in response to detecting a selection operation for the formula editing region, determining a rendering style corresponding to the target rich text; and
   adjusting a way for presenting the style control corresponding to the respective determined rendering style in the presentation interface.

4. The method of claim 3, wherein the determining a rendering style corresponding to the target rich text comprises:
   obtaining rendering styles that are applied when performing the rendering for the content by the rich text editor;
   determining at least one applied target rendering style based on the number of rendering characters corresponding to the respective rendering styles from the rendering styles that are applied; and
   determining the rendering style corresponding to the target rich text based on the at least one applied target rendering style.

5. The method of claim 1,
   wherein the style change instruction is a first style change instruction, and the first style change instruction is used to change the style of the rich text.

6. The method of claim 5, wherein the target table comprises a presentation interface, the presentation interface comprises at least one style control, and each style control is used to indicate a rendering style; and
   the first style change instruction is generated by:
   generating the first style change instruction based on a triggering operation for the presented style control.

7. The method of claim 1,
   wherein the style change instruction is a second style change instruction, and the second style change instruction is used to change the style of the target rich text.

8. The method of claim 7, wherein the second style change instruction is generated by:
   in response to detecting a selection operation for the formula editing region, presenting an editing operation interface corresponding to the rich text editor, wherein the editing operation interface comprises at least one editing icon; and
   generating the second style change instruction based on a selection operation for an editing icon in the editing operation interface.

9. The method of claim 1, wherein the style of the rich text comprises at least one of the following:
   a font, a glyph, a hyperlink, an attachment link, or a link for indicating a specific user.

10. An electronic device, comprising:
    one or more processors; and
    a memory for storing one or more programs which, when executed by the one or more processors, cause the one or more processors to implement a method for content presentation comprising:
    in response to detecting a selection operation for a cell in a target table, obtaining a content of a rich text in the selected cell, and determining a style of the rich text;
    generating a target rich text to be presented in a formula editing region of the target table based on the content of the rich text and the style of the rich text, wherein the target rich text has the same style as the rich text;
    presenting the target rich text in the formula editing region of the target table; and
    in response to receiving a style change instruction, changing the style of the rich text and the style of the target rich text according to the style change instruction, wherein the style change instruction is used to change the style of the rich text or the style of the target rich text.

11. The device of claim 10, wherein the generating a target rich text to be presented in a formula editing region of the target table based on the content of the rich text and the style of the rich text comprises:
    generating a style rendering instruction based on the style of the rich text;
    inputting the style rendering instruction and the content into a rich text editor, wherein the rich text editor is used to perform style rendering for the content according to the style rendering instruction; and
    generating the target rich text based on a result of the rendering of the content by the rich text editor.

12. The device of claim 10, wherein the target table comprises a presentation interface, the presentation interface comprises at least one style control, and each style control is used to indicate a rendering style; and the method further comprises:
- in response to detecting a selection operation for the formula editing region, determining a rendering style corresponding to the target rich text; and
- adjusting a way for presenting the style control corresponding to the respective determined rendering style in the presentation interface.

13. The device of claim 12, wherein the determining a rendering style corresponding to the target rich text comprises:
- obtaining rendering styles that are applied when performing the rendering for the content by the rich text editor;
- determining at least one applied target rendering style based on the number of rendering characters corresponding to the respective rendering styles from the rendering styles that are applied; and
- determining the rendering style corresponding to the target rich text based on the at least one applied target rendering style.

14. The device of claim 10, further comprising:
- wherein the style change instruction is a first style change instruction, and the first style change instruction is used to change the style of the rich text.

15. The device of claim 14, wherein the target table comprises a presentation interface, the presentation interface comprises at least one style control, and each style control is used to indicate a rendering style; and the first style change instruction is generated by:
- generating the first style change instruction based on a triggering operation for the presented style control.

16. The device of claim 10,
- wherein the style change instruction is a second style change instruction, and the second style change instruction is used to change the style of the target rich text.

17. The device of claim 16, wherein the second style change instruction is generated by:
- in response to detecting a selection operation for the formula editing region, presenting an editing operation interface corresponding to the rich text editor, wherein the editing operation interface comprises at least one editing icon; and
- generating the second style change instruction based on a selection operation for an editing icon in the editing operation interface.

18. The device of claim 10, wherein the style of the rich text comprises at least one of the following:
- a font, a glyph, a hyperlink, an attachment link, or a link for indicating a specific user.

19. A non-transitory computer-readable medium storing a computer program thereon, the program, when executed by a processor, implementing a method for content presentation comprising:
- in response to detecting a selection operation for a cell in a target table, obtaining a content of a rich text in the selected cell, and determining a style of the rich text;
- generating a target rich text to be presented in a formula editing region of the target table based on the content of the rich text and the style of the rich text, wherein the target rich text has the same style as the rich text;
- presenting the target rich text in the formula editing region of the target table; and
- in response to receiving a style change instruction, changing the style of the rich text and the style of the target rich text according to the style change instruction, wherein the style change instruction is used to change the style of the rich text or the style of the target rich text.

20. The non-transitory computer-readable medium of claim 19, wherein the generating a target rich text to be presented in a formula editing region of the target table based on the content of the rich text and the style of the rich text comprises:
- generating a style rendering instruction based on the style of the rich text;
- inputting the style rendering instruction and the content into a rich text editor, wherein the rich text editor is used to perform style rendering for the content according to the style rendering instruction; and
- generating the target rich text based on a result of the rendering of the content by the rich text editor.

* * * * *